Dec. 25, 1956  M. J. HOBERMAN  2,775,752
ELECTRONIC INTERMITTENT RECORDER
Filed Aug. 10, 1954  2 Sheets-Sheet 1

MULTIPLICITY OF SIMILAR CIRCUITS

INVENTOR
MAX J. HOBERMAN
BY
ATTORNEY

Dec. 25, 1956  M. J. HOBERMAN  2,775,752
ELECTRONIC INTERMITTENT RECORDER
Filed Aug. 10, 1954  2 Sheets-Sheet 2

MULTIPLICITY OF SIMILAR CIRCUITS

INVENTOR
MAX J. HOBERMAN
BY *Cyrus D. Samuelson*
ATTORNEY

United States Patent Office 2,775,752
Patented Dec. 25, 1956

2,775,752

ELECTRONIC INTERMITTENT RECORDER

Max J. Hoberman, Fairlawn, N. J.

Application August 10, 1954, Serial No. 448,975

2 Claims. (Cl. 340—223)

My invention relates to an electronic intermittent recorder, for detecting intermittent troubles in mechanical, electrical, electronic equipment and the like.

An important object of the invention is to detect increasing or decreasing changes in voltage or current which affect the operation of the device being tested.

A further object of the invention is to determine the circuit of the device being tested which is not operating properly by virtue of the intermittent increase or decrease of voltage.

A still further object of the invention is to enable the person, who is using it, to monitor several suspected circuits in the device being tested and to rapidly set the instrument up on other circuits in the event the first ones selected are not at fault.

Other objects and advantages of the invention will be apparent during the course of the following description.

Figure 1:
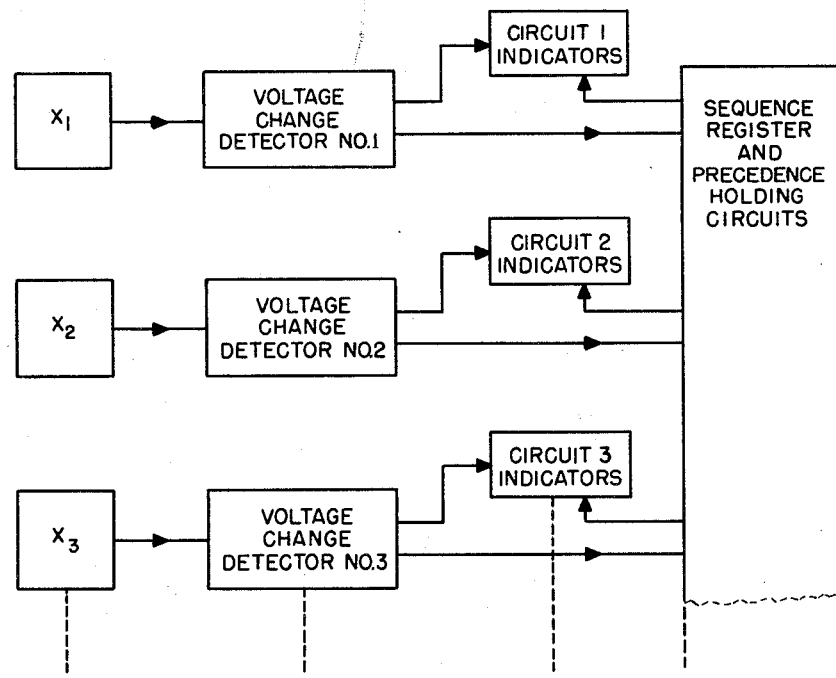
Figure 2:
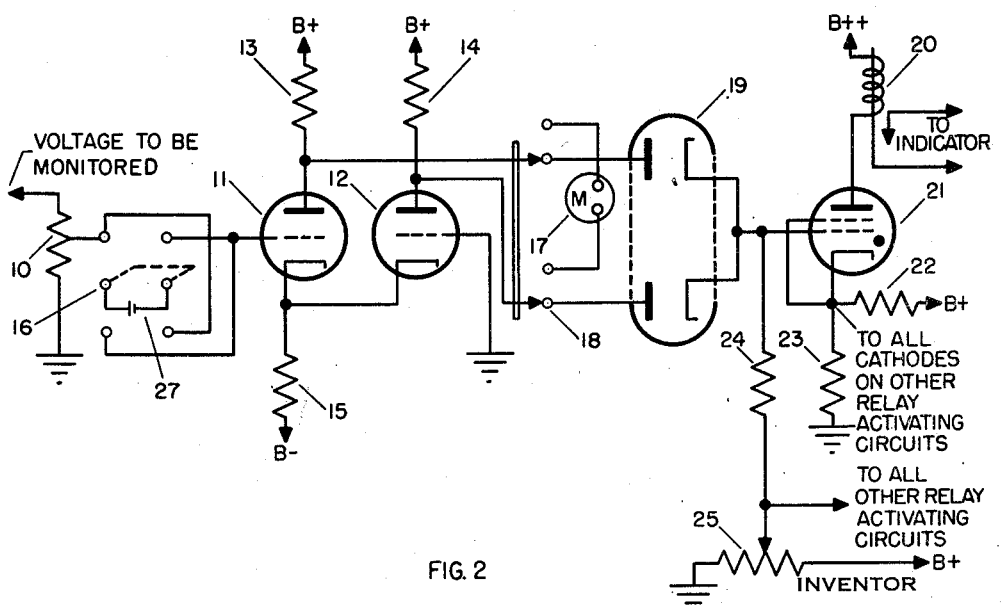
Figure 3:
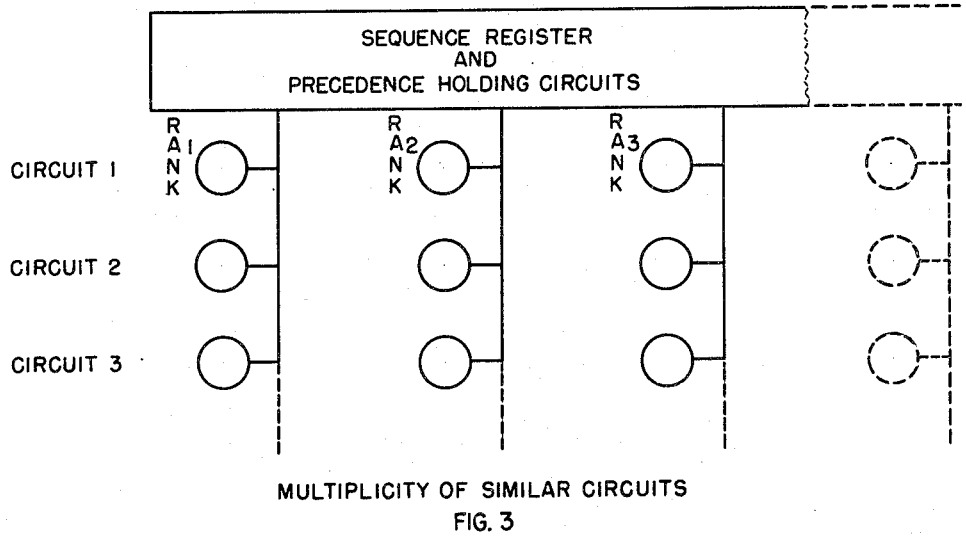
Figure 4:
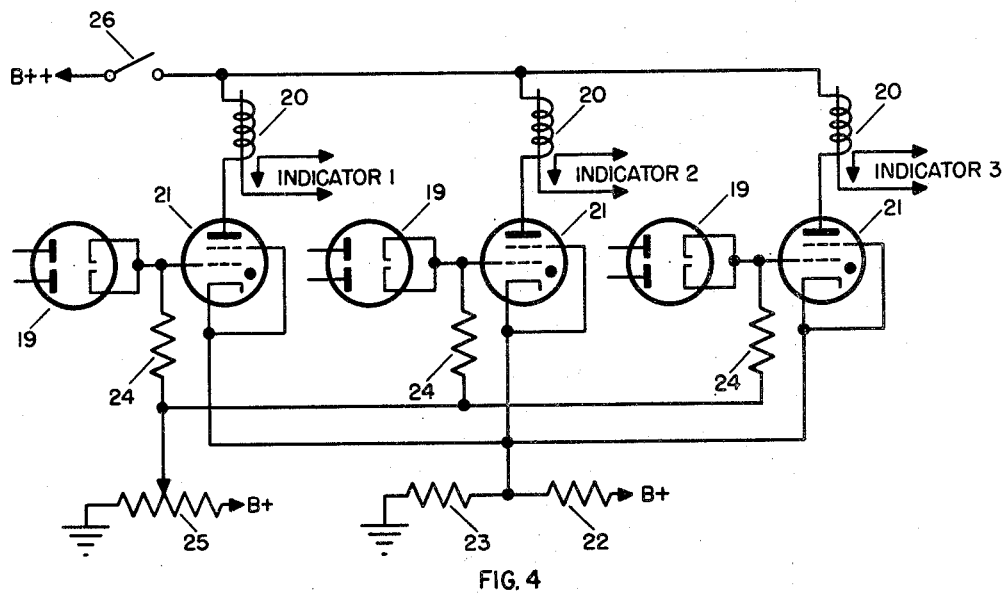

In the accompanying drawings, forming a part of this application, and in which like numerals are employed to designate like parts throughout the same, Figure 1 is a block diagram of the electronic circuits of my invention, Figure 2 is a schematic diagram of one of the detecting and indicating circuits, Figure 3 is a block diagram of the circuit and rank indicators, and Figure 4 is a schematic diagram of the sequence register and the precedence holding circuits.

In the drawings, wherein for the purpose of illustration, is shown a preferred embodiment of my invention, the numeral 10 designates the circuit input potentiometer. Numerals 11 and 12 represent the vacuum tubes which form a part of the vacuum tube bridge and numerals 13 and 14 designate the resistors which are a part of the vacuum tube bridge. Numeral 15 designates the circuit cathode load resistor and numeral 16 designates the polarity reversing switch, one of which is associated with each circuit. Numeral 17 designates the meter and numeral 18 designates the circuit metering switch one of which is contained in each circuit. Numeral 19 designates the circuit gating diode and numeral 20 designates the circuit indicator relay, there is one of each of these for each circuit.

Numeral 21 designates the circuit indicator activator and numerals 22 and 23 designate portions of the voltage divider which establishes the cathode potential of the circuit indicator activators. Numeral 24 designates the grid resistor of the circuit indicator activator and numeral 2 designates the grid potential potentiometer. Numeral 26 designates the indicator reset switch and numeral 27 designates the circuit voltage standard.

The reversing switch 16 is used to balance the voltage being monitored so that the vacuum tube bridge which is comprised of 11, 12, 13 and 14 is balanced identically for a plus input as well as for a minus input. In the balanced condition, the indicator associated with the circuit is off and the instrument is ready for operation. If the voltage being monitored departs from the balanced condition by a pre-determined amount, which is a function of the circuit sensitivity, the sequence register and precedence holding circuits are activated and the indicator for the unbalanced circuit is activated. In one embodiment of my invention, the action of the first unbalanced circuit activates its associated indicator and locks-out or prevents any other circuit under test from activating its indicator. This embodiment permits only the first trouble to be detected. In another embodiment of my invention, each unbalanced circuit operates and activates its own indicator such that, the first unbalance, which occurs, activates its associated indicator in rank 1, the second unbalance, which occurs, activates its associated indicator in rank 2 and so on. Figure 3 illustrates one arrangement of the indicators described in the latter embodiment of my invention. A third embodiment of my invention is the permanent connection of the system to certain critical circuits contained in various types of electronic, electrical and mechanical systems such as radar devices, computers, printing presses, communications systems and the like.

The operation of the electronic intermittent recorder is as follows:

The voltages to be monitored, the circuits being studied, are connected at the point marked Voltage to be Monitored in Figure 2; each such circuit to be studied being connected to a separate circuit in the intermittent recorder. The meter switch, 18, is thrown to the position which connects meter, 17, to the plates of 11 and 12 of circuit 1. The polarity reversing switch, 16, of circuit 1 is thrown to the correct position to balance the polarity of the battery, 27, against the voltage being monitored and the circuit input potentiometer, 10, is adjusted so as to balance the voltage being monitored against the battery voltage. The same procedure is followed for as many circuits as are to be studied and can be accommodated by the particular model intermittent recorder being used. After all the above adjustments and connections have been made, the indicator reset switch, 26, is operated and the indicators are all ready for operation.

In the embodiment of my invention which contains the "lock out" feature, namely the model, which permits only the first unbalance, which occurs, to activate its indicator, the operation is as follows:

At balance, the plate voltages of 11 and 12 are substantially equal and the plates of 19 are at a lower potential than the cathodes and the tube 19 is not conducting current. At this time the grid of circuit indicating activator 21 is of such a value as to prevent the flow of current in 21. The point marked B++ must be of substantially higher positive potential than the point marked B+ in order for the circuit to operate properly. The first circuit to become unbalanced an amount greater than a predetermined percentage which is established by the sensitivity of the associated bridge circuit, in point of time, causes either 11 or 12 to become unbalanced and in turn one of these plate voltages applies a higher positive potential to one of the diodes of 19, causing it to conduct and thus raise the voltage on the grid of 21, causing it to strike. The current flow in the plate circuit of 21 activates the associated indicator. The striking of 21 raises the cathode potential of 21 and since it is connected to all the other cathodes of 21 associated with the other circuits being monitored, it prevents them from being actuated because the cathode potential is higher than that to which the grid is capable of being raised. This is true because the potential at B++ is substantially higher than that at B+.

In the embodiment of my invention, which does not contain the "lock out" feature, the operation is as follows:

The individual circuits are adjusted and balanced as in the model containing the "lock out" feature. However, the cathodes of the circuit indicator activators 21 are not connected together, so that each circuit which develops an unbalance will separately activate its associated indicator.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. An electronic intermittent recorder comprising more than one change detector and indicator; each said change detector including means for establishing a balanced condition for the signal applied thereto, regardless of polarity, over a range of magnitudes and being responsive to change in either direction in the signal applied thereto; said indicators being responsive to the action of their associated change detectors when the signal applied to said change detector departs from its normal value by more than a fixed preestablished percentage such that said indicators shall not be responsive to any action of the change detectors after the first such action wherein the signal applied to one of said change detectors departed from its normal value by more than a fixed preestablished percentage.

2. An electronic intermittent recorder comprising more than one change detector, indicators and means for determining precedence and sequence; each said change detector including means for establishing a balanced condition for the signal applied thereto, regardless of polarity, over a range of magnitudes and being responsive to change in either direction in the signal applied thereto; said means for determining precedence and sequence being responsive to the action of the change detector when the signal applied to said change detector departs from its normal value by more than a fixed preestablished percentage and to the time of occurence of the action of the change detector; said indicators being responsive to the action of the means for determining precedence and sequence wherein the said precedence and sequence are determined by the times at which the various signals applied to said change detectors departed from their normal values by more than fixed preestablished percentages.

References Cited in the file of this patent

UNITED STATES PATENTS

| | | |
|---|---|---|
| 2,130,411 | Bedford | Sept. 20, 1938 |
| 2,206,827 | Prince | July 2, 1940 |
| 2,405,397 | Bedford | Aug. 6, 1946 |
| 2,547,011 | Jacobsen | Apr. 3, 1951 |
| 2,558,637 | Walz | June 26, 1951 |
| 2,569,442 | Anderson | Oct. 2, 1951 |